United States Patent [19]

Nordstrom et al.

[11] Patent Number: 5,058,419

[45] Date of Patent: Oct. 22, 1991

[54] METHOD AND APPARATUS FOR DETERMINING THE LOCATION OF A SOUND SOURCE

[75] Inventors: Kari N. Nordstrom; Ronald C. Rothman, both of Duluth, Minn.

[73] Assignees: Earl H. Ruble; Earl Ruble and Associates, Inc., both of Duluth, Minn.

[21] Appl. No.: 506,786

[22] Filed: Apr. 10, 1990

[51] Int. Cl.$^5$ .............................................. G01M 3/24
[52] U.S. Cl. .................................. 73/40.50 A; 73/592; 367/125
[58] Field of Search ........................... 73/40.5 A, 592; 367/125

[56] References Cited

U.S. PATENT DOCUMENTS

| 3,532,867 | 10/1970 | Ricketts, Jr. et al. | 367/125 X |
| 4,289,019 | 9/1981 | Claytor | 73/40.5 A |
| 4,333,170 | 6/1982 | Mathews et al. | 367/125 |
| 4,581,758 | 4/1986 | Coker et al. | 367/125 X |

FOREIGN PATENT DOCUMENTS

| 87022 | 7/1980 | Japan | 73/40.5 A |
| 70138 | 3/1988 | Japan | 73/40.5 A |
| 934269 | 6/1982 | U.S.S.R. | 73/40.5 A |

Primary Examiner—Hezron E. Williams
Assistant Examiner—Joseph W. Roskos
Attorney, Agent, or Firm—Foley & Lardner

[57] ABSTRACT

An apparatus and method for determining the location of a pipe leak detects the pipe leak sound at a first remote location and at a second remote location, and generates first and second signals indicative of the sound. A time lay between the first and second signals is calculated at each of a plurality of frequencies. Integer multiplies of an associated period are added to each time lag to form a plurality of potential time delays at each of the plurality of frequencies. The plurality of potential time delays at all of the plurality of frequencies are stored in a memory. The time delay value which occurs most frequently is selected from the memory and is utilized to calculate the location of the sound source relative to the first and second locations. The invention can also be employed to determined the location of a sound source other than a pipe leak.

37 Claims, 12 Drawing Sheets

| Frequency (Hz) | Phase at A (degrees) | Phase at B (degrees) | Phase at A-Phase at B (degrees) | Phase at A-Phase at B (radians) |
|---|---|---|---|---|
| 20 | 0 | 180 | -180 = 180 | $\pi$ |
| 35 | 90 | 225 | -135 = 225 | 1.25 $\pi$ |
| 50 | 180 | 270 | -90 = 270 | 1.5 $\pi$ |
| 70 | 180 | 90 | 90 | 0.5 $\pi$ |
| 100 | 0 | 180 | -180 = 180 | $\pi$ |
| 140 | 0 | 180 | -180 = 180 | $\pi$ |

FIG. 3

METHOD AND APPARATUS FOR DETERMINING THE LOCATION OF A SOUND SOURCE

BACKGROUND OF THE INVENTION

The present invention relates to a method and apparatus for determining the location of a sound source. The present invention is particularly suitable for determining the location of a leak in an underground pressurized pipe.

There are many applications where determination of the location of a sound source is required. One such application is the determination of the location of fluid leaks in underground pressurized pipes by use of the sound produced by the leak. Detection of the exact location of fluid leaks in underground pipes is desirable to avoid unnecessary, costly, and time-consuming excavations to find the leak location.

One prior art system for locating underground fluid pipe leaks is disclosed in U.S. Pat. No. 4,083,229, issued Apr. 11, 1978 to A.R. Anway. In the '229 patent, a fluid leak is located by converting the sound intercepted at two points along the pipe into electrical signals using two transducers. The extent of correlation between the two electrical signals is varied by variably time delaying one electrical signal relative to the other electrical signal. The time delay at which the amplitudes of the two electrical signals match-up is used to determine the leak location utilizing the fact that this time delay is indicative of the location of the leak relative to the two transducers.

Unfortunately, since the system disclosed in the '229 patent computes the time delay based upon matching-up signal amplitudes, any frequency dependent amplitude attenuation of the leak sound contributes to inaccuracy in the leak location determination. Since higher frequencies are attenuated more than lower frequencies, the shape of the leak sound waveforms changes as the sound travels. Thus, determining distance information by attempting to match-up a non-delayed waveform and a delayed waveform results in inherent inaccuracies.

Thus, there is a need for a method and apparatus which determines the location of a sound source, such as a pressurized pipe leak, independently of the amplitudes of the generated sound.

SUMMARY OF THE INVENTION

It is an object of the present invention, therefore, to provide a method and apparatus for determining the location of a sound source, such as a pipe leak, independently of the amplitude of the sound generated.

It is a further object of the present invention to provide a method and apparatus for determining the location of a sound source which uses phase information to determine the location of the sound source.

It is another object of the invention to provide an improved pipe leak locator.

It is another object of the invention to locate the source of a pipe leak using information based on the frequency spectrum of pipe leak sound.

According to a first aspect of the invention there is provided a method of determining the location of a sound source. Sound is detected at a first location remote from the sound source and a first signal is generated indicative of the sound at the first location. Sound is detected at a second location remote from the sound source and a second signal is generated indicative of the sound at the second location. A time lag between the first and second signals is calculated at each of a plurality of frequencies. Integer multiples of an associated period are added to each time lag to form a plurality of potential time lags at each of the plurality of frequencies. Then, the number of occurrences of the plurality of potential time lags among all of the plurality of frequencies is stored in a memory. A time lag value which occurs most frequently is then selected from the memory. The time lag value which occurs most frequently is utilized as a time delay to calculate the location of the sound source relative to the first and/or second locations.

According to a second aspect of the invention there is provided an apparatus for determining the location of a sound source. The apparatus includes a first detector, located at a first location remote from the sound source, for converting sound from the sound source into a first signal. A second detector, located at a second location remote from the sound source, converts sound from the sound source into a second signal. A computer calculates a first frequency component and first phase angles of the first signal and calculates a second frequency component and second phase angles of the second signal. The computer then calculates phase differences between the first phase angles and the second phase angles at each of a plurality of frequencies and converts the phase differences into a plurality of time lags. The computer then adds to each time lag of the plurality of time lags integer multiples of an associated period to form a plurality of potential time delays at each of the plurality of frequencies. The computer determines which time delay occurs most frequently among all of the plurality of potential time delays at all of the plurality of frequencies. The computer then calculates the location of the sound source utilizing the most frequently occurring time delay.

BRIEF DESCRIPTION OF THE DRAWINGS

The present invention will be described below with reference to the accompanying drawings, wherein:

FIG. 3 is a table listing phase information at various frequencies;

DETAILED DESCRIPTION OF THE PREFERRED EMBODIMENTS

Figure 1:
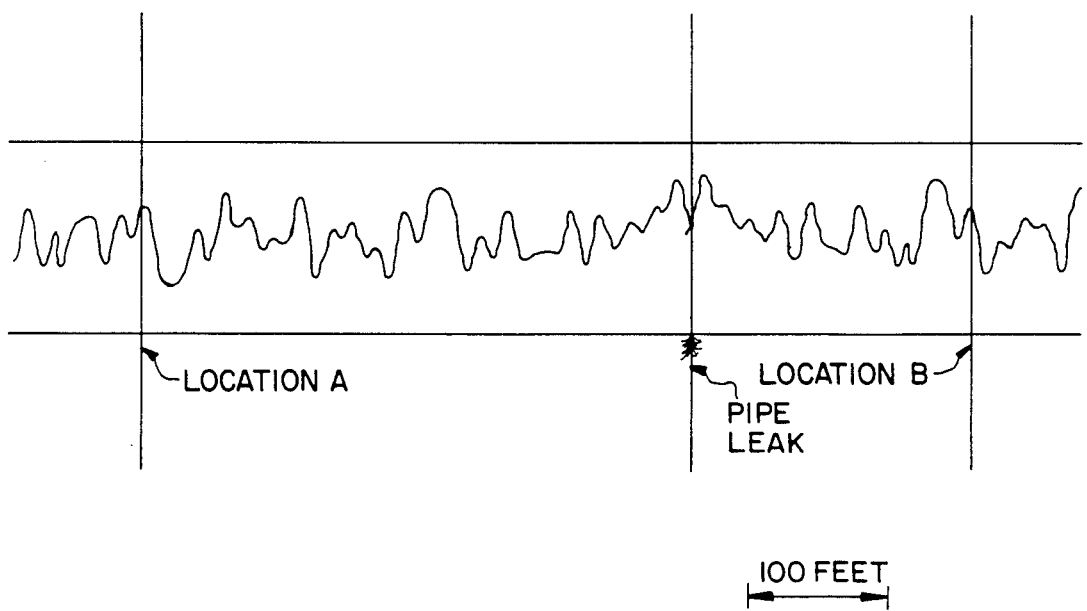
FIG. 1 is a graph illustrating sound propagating from a pipe leak.

FIG. 1 illustrates sound propagating from a pipe leak. The sound is generated by pressurized fluid leaking through a pipe wall. The sound travels through fluid contained in the pipe and/or the pipe wall itself. While the physics of pipe leak sound generation and propagation may not be completely understood, proper operation of the invention is not dependent upon any specific model of sound generation and propagation. FIG. 1 is a snap shot at one instant in time, that is, FIG. 1 represents the leak signal at positions along the pipe at a single instant in time.

Throughout the descriptions below, the term "time delay" is used. The meaning of time delay can be understood by imagining two different objects initially located at the location of the pipe leak. As time progresses, one object will move towards location A and the other object will move towards location B. The velocities of the objects moving towards A and B are constant and equal. Since location B is closer to the pipe leak than location A, the object traveling from the pipe leak to location B will arrive at location B before the object traveling from the pipe leak to location A arrives at location A. The difference between the arrival time of the object arriving at location B and the arrival time of the object arriving at location A is the time delay. The equations for determining the location of the pipe leak are as follows:

$$La = (L + T \cdot V)/2 \quad (1)$$

$$Lb = (L - T \cdot V)/2 \quad (2)$$

$$Lb = L - La \quad (3)$$

where:

L is the distance along the pipe between location A and location B;

T is the time delay, described above;

La is the distance along the pipe between the pipe leak and location A;

Lb is the distance along the pipe between the pipe leak and location B;

V is the velocity of leak sound propagation.

The purpose of the present invention is to ascertain La and/or Lb. The value of L is known in advance or is measured. The velocity V can be calculated using properties of the fluid in the pipe, pipe material properties and pipe geometry. Suitable techniques for calculating V are described in American Water Works Association (Denver, Colorado) standards AWWA C401-77 and ANSI/AWWA C403-78, incorporated herein by reference, and in standard engineering texts.

The only remaining value needed in order to ascertain La and/or Lb is the value of T. The technique employed by the present invention to determine T will be described in detail below by way of a numerical example.

Figure 2:
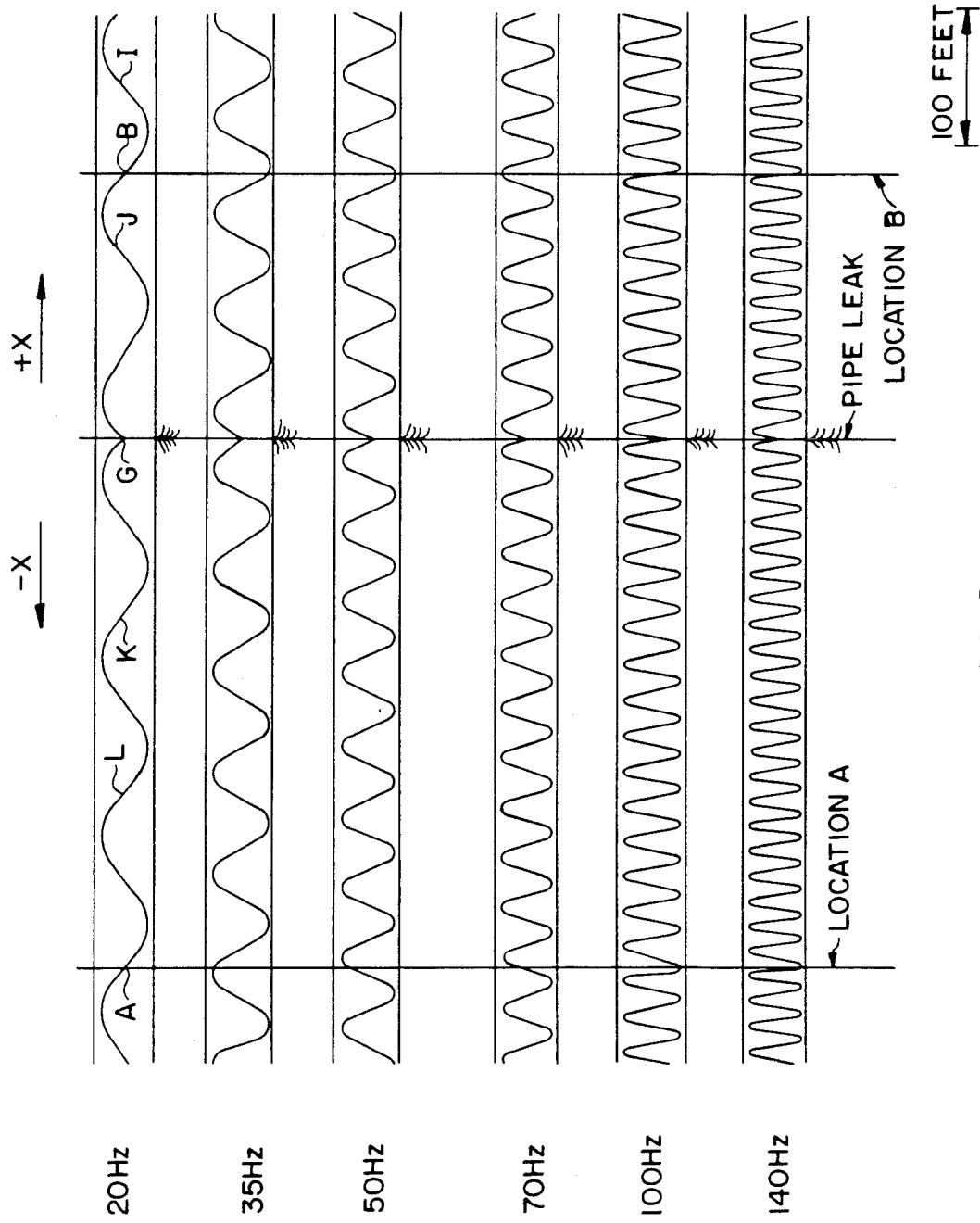
FIG. 2 illustrates individual frequency components of a leak signal.

FIG. 2 illustrates individual frequency components of a leak sound signal at a given instant in time. That is, FIG. 2 illustrates 20 Hz, 35 Hz, 50 Hz, 70 Hz, 100 Hz and 140 Hz components of a leak sound signal at a snap shot in time. The specific frequencies and number of frequency components illustrated in FIG. 2 will be used for illustrative purposes in a simplified numerical example. In actual operation, a preferred embodiment of the present invention generates 2048 discrete frequency components ranging from approximately 0 Hz to 2000 Hz in approximately 0.976 Hz intervals.

As illustrated in the FIG. 2 example, the pipe leak generates sound at the pipe leak location which contains six frequency components. Some of the sound travels in the +X direction towards location B and some of the sound travels in the −X direction towards location A. If the phase of the sound for all of the frequency components at the pipe leak location is defined as zero phase, the phase of each of the frequency components at location A and location B is as listed in FIG. 3.

The method of obtaining the values listed in FIG. 3 can be understood from examination of the 20 Hz component illustrated in FIG. 2. In FIG. 2, the 20 Hz component has a zero phase angle at the pipe leak location, point G. The 20 Hz component also has a zero phase angle every 360° from point G, that is, at points K, L, and A in the −X direction and at points J and I in the +X direction. The phase angle at point B is 180°.

By definition, frequency is phase change divided by time change. If phase changes are expressed in radians and time changes are expressed in seconds then frequency has units of radians per second. The following equation defines frequency:

$$\omega = \frac{\Delta \phi}{\Delta t} \quad (4)$$

where:

$\omega$ is radian frequency in radians per second;

$\Delta \phi$ is phase change in radians; and $\Delta t$ is time change in seconds.

Equation (4) can be rearranged as follows:

$$\Delta t = \frac{\Delta \phi}{\omega} \quad (5)$$

Equation (5) states that a phase change can be converted into a time change. This time change will be referred to as a time lag. Note that the time delay and time lag, as defined above, represent different physical quantities.

Equation (5) can be expressed in terms of Hertz by use of the following relationship:

$$\omega = 2\pi f \quad (6)$$

where:

$\omega$ is radian frequency in radians per second; and f is frequency in cycles per second (seconds$^{-1}$) or Hertz.

Thus, Equation (5) becomes:

$$\Delta t = \frac{\Delta \phi}{2\pi f} \quad (7)$$

The inverse of frequency f is the period P of the waveform as expressed by the following equation:

$$P = \frac{1}{f} \quad (8)$$

where P is the period of the waveform in seconds.

Equation (7) can be used to convert the phase difference information of FIG. 3 into time lag information. Table 1 tabulates the FIG. 3 phase difference information in terms of time lags. In Table 1, the time lags are expressed in two ways, the time lag associated with the phase at A minus the phase at B, and the time lag associated with the phase at B minus the phase at A. These two different time lags always add up to the period of the waveform.

TABLE 1

| Frequency (Hz) | Time Lag A-B (milliseconds) | Time Lag B-A (milliseconds) | Period P (milliseconds) |
| --- | --- | --- | --- |
| 20 | 25.00 | 25.00 | 50.00 |
| 35 | 17.86 | 10.71 | 28.57 |
| 50 | 15.00 | 5.00 | 20.00 |
| 70 | 3.57 | 10.71 | 14.29 |
| 100 | 5.00 | 5.00 | 10.00 |
| 140 | 3.57 | 3.57 | 7.14 |

For each frequency of leak sound, the time delay indicative of the time it takes for sound to travel from the leak to a specific location is numerically equal to the time lag plus some integer multiple of the period. For example, using the time lag and period information tabulated in Table 1 for the 35 Hz signal, possible values of the time delay are as follows:

$$
\begin{aligned}
\text{Time Delay} &= 17.86 + 0 \cdot 28.57 = 17.86 \text{ ms} \quad (9-0) \\
&= 17.86 + 1 \cdot 28.57 = 46.43 \text{ ms} \quad (9-1) \\
&= 17.86 + 2 \cdot 28.57 = 75.00 \text{ ms} \quad (9-2) \\
&\quad \vdots \\
&= 17.86 + N \cdot 28.57 \quad (9-N) \\
\text{Time Delay} &= 10.71 + 0 \cdot 28.57 = 10.71 \text{ ms} \quad (10-0) \\
&= 10.71 + 1 \cdot 28.57 = 39.28 \text{ ms} \quad (10-1) \\
&= 10.71 + 2 \cdot 28.57 = 67.85 \text{ ms} \quad (10-2) \\
&\quad \vdots \\
&= 10.71 + M \cdot 28.57 \quad (10-M)
\end{aligned}
$$

where N and M are integers.

Equations (9-0) through (9-N) are associated with the Time Lag A-B and Equations (10-0) through (10-M) are associated with Time Lag B-A.

Only one of Equations (9-0) through (9-N) and (10-0) through (10-M) actually specifies the correct time delay. In order to ascertain the correct time delay, a statistical technique is employed. The statistical technique involves calculating possible time delay values for each leak sound frequency component in a manner analogous to Equations (9-0) through (9-N) and (10-0) through (10-M). After calculating all possible time delay values at every leak sound frequency, in a manner similar to Equations (9-0) through (9-N) and (10-0) through (10-M), the particular time delay value which occurs most frequently is selected as the time delay for use in calculating the leak location in accordance with Equations (1) and (2). The maximum integer values, such as the values of N and M in Equations (9-N) and (10-M), are selected based on the maximum physically possible time delay. Experience has shown that the most probable time delay value corresponds to the actual, physically correct, time delay value often enough to form the basis for a reliable calculation of leak location.

Figure 4:
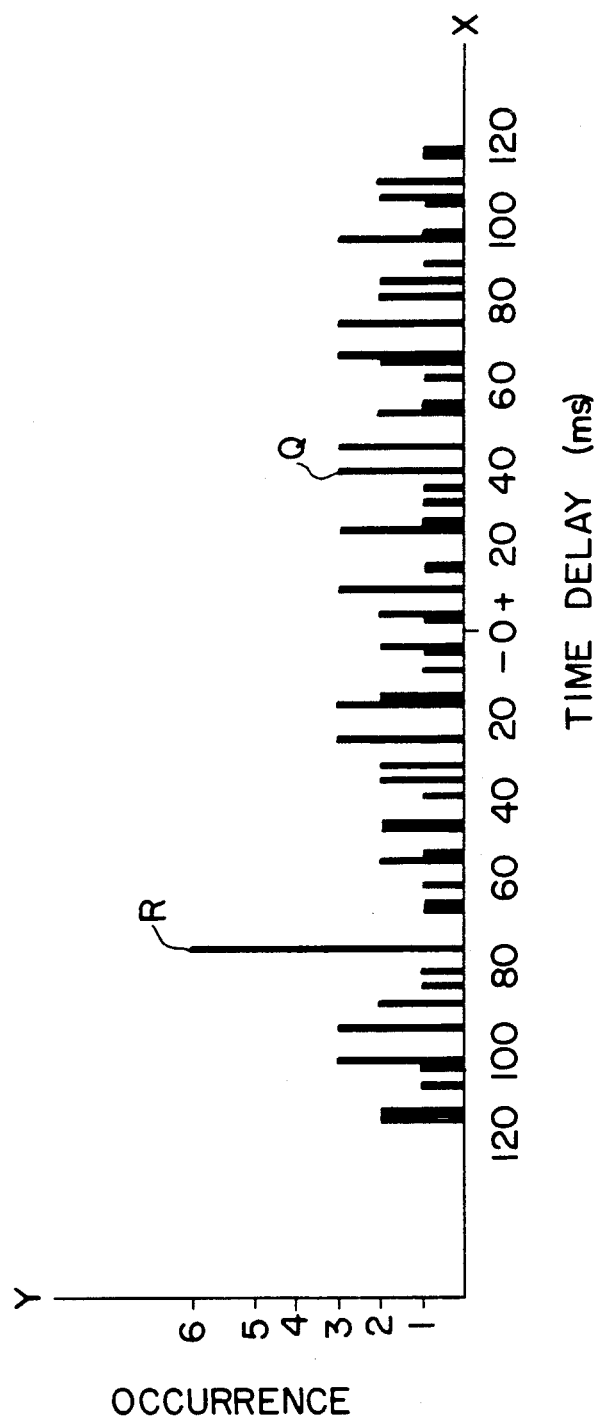
FIG. 4 is a histogram illustrating occurrences of potential time delay values.

Graphing the potential time delay values is frequently helpful. FIG. 4 illustrates a histogram of potential time delay values. In FIG. 4, the x axis represents various possible time delay values. The positive x axis corresponds to B-A time delays and the negative x axis corresponds to A-B time delays. The y axis indicates the occurrence rate of each possible time delay.

FIG. 4 is constructed by calculating all of the possible time delay values, in the manner described above, for all of the leak sound frequencies and then plotting the number of times a particular time delay value occurs within a narrow range. For example, histogram bar Q illustrates that three possible time delay values occurred within the range of 38 ms to 40 ms. One of these three possible time delay values resulted from the Equation (10-1) calculation. The other two values resulted from frequencies other than 35 Hz.

The R histogram bar of FIG. 4 indicates that six possible time delay values occurred in the range of 74 ms to 76 ms. Since this time delay range has the most number of occurrences, the average of this range, 75 ms, is selected as the time delay to be used in calculating the leak location.

The histogram of potential time delay values is an indicator of the overall reliability of the leak location calculation. For example, if one particular time delay value does not occur significantly more frequently than other possible time delay values, this may be an indication that the calculation is not reliable.

Using the time delay T value of 75 ms, determined by examination of the FIG. 4 histogram, a velocity V of 2666.67 feet per second, and a distance L between location A and location B of 600 feet, Equations (1) and (3) can be used to calculate the leak location as follows:

$$La = (600 + 0.075 \cdot 2666.67)/2 = 400 \text{ feet} \quad (11)$$

$$Lb = 600 - 400 = 200 \text{ feet} \quad (12)$$

Figure 5:
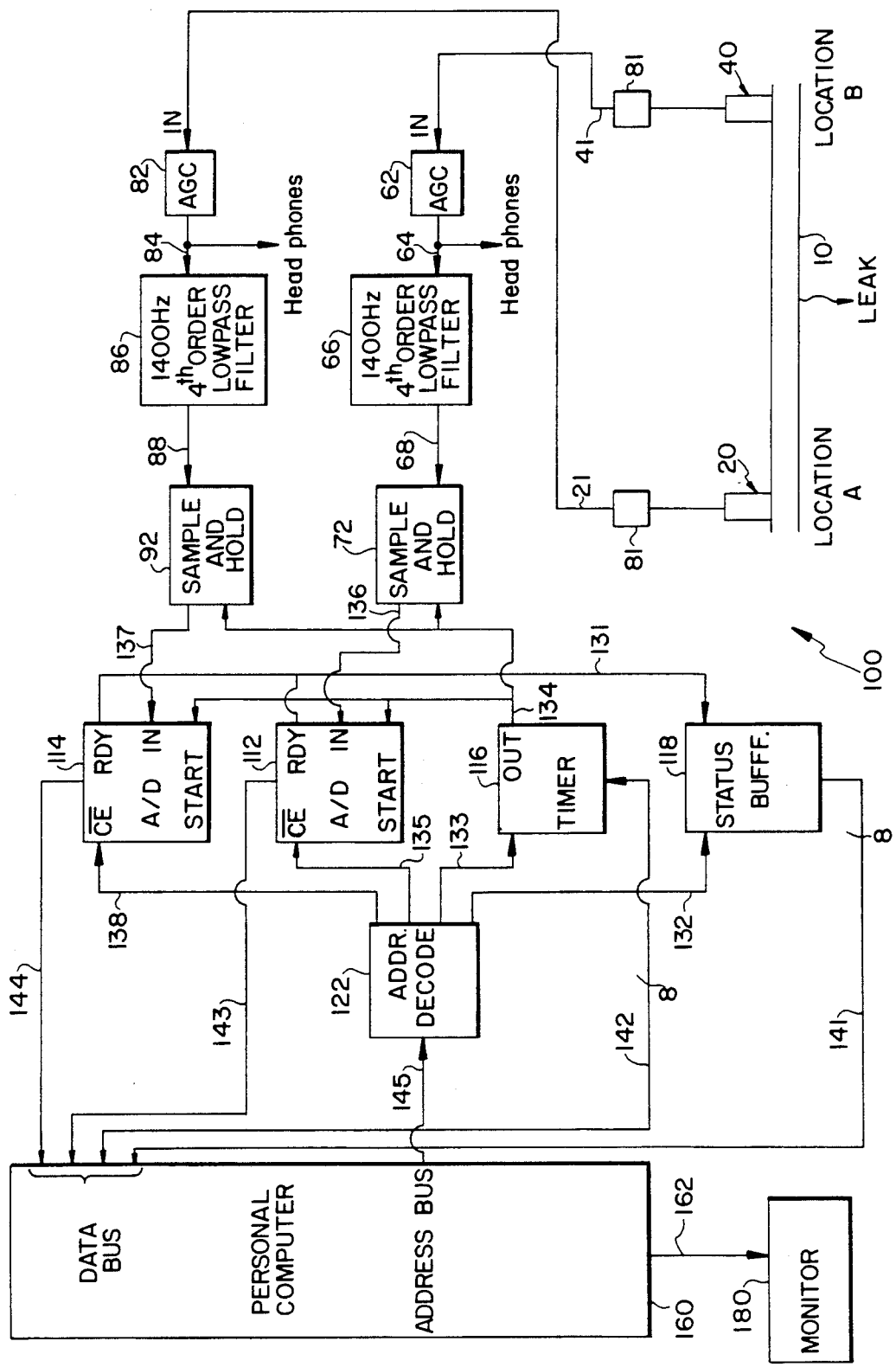
FIG. 5 illustrates an apparatus for determining the location of a pipe leak according to a preferred embodiment of the invention.

FIG. 5 illustrates an apparatus for determining the location of a pipe leak according to a preferred embodiment of the invention which employs the technique described above. The FIG. 5 apparatus will be referred to as a pipe leak locator 100 in the description below. Even though the pipe leak locator 100 relies on a statistical technique for ascertaining the leak location, the use of the statistical technique almost always results in a correct leak location determination.

The locator 100 includes two transducers 20 and 40 on a pipe 10 at locations A and B, respectively. The pipe 10 may be, for example, a water main. In between transducers 20 and 40 is a pipe leak which generates sound which is transmitted to transducers 20 and 40 through the pipe fluid and/or the pipe wall in the form of pressure variations. The transducers 20 and 40 are typically placed several hundred feet apart at convenient locations. The transducers can be placed in excess of 1000 feet apart. The transducers can be attached to a fire hydrant attached to the pipe or the transducers can be attached to a valve in the pipeline in a valve vault. If a readily accessible location is not available and the pipe is located underground, a bar can be driven into the ground to contact the pipe to establish a sound transmission path to the transducers. It is important for proper operation to have a non-resilient sound transmission path between the pipe and the transducers. Resilient material, such as paint, in the sound transmission path should be removed if practical.

Figure 6:
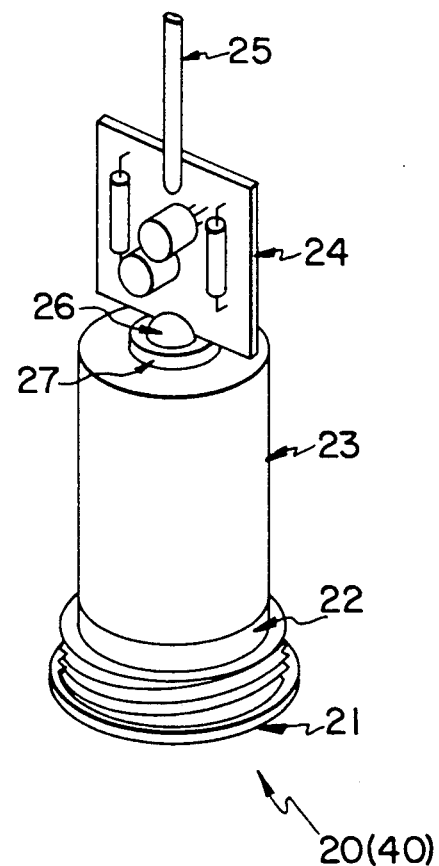
FIG. 6 illustrates a transducer of FIG. 5.

FIG. 6 illustrates a design of a transducer suitable for use as transducers 20 and 40 of FIG. 5. The function of the transducers is to detect minute elastic deflections of the pipe walls due to pressure fluctuations arising from the piping fluid leaking through the pipe 10. The transducer 20 (40) includes a base 21, a piezoceramic element 22, a seismic mass 23, and a preamp (or preamplifier) 24. Also illustrated in FIG. 6 is a center connector pin 25, a bolt 26, and a nylon washer 26. Minute deflections of the pipe wall cause minute deflections in the piezoceramic element 22. Due to the properties of piezoceramic materials, the minute deflections of the piezoceramic element cause a small charge or potential to develop between the two opposing faces of the piezoceramic element 22. This small charge or potential is then amplified for practical use, such as listening to the sound of the pipe leak through headphones or processing by the pipe leak locator 100, in a manner to be described in further detail below.

In order for minute deflections of the pipe to cause sufficient deflections in the piezoceramic element 22, a seismic mass 23 is physically attached to the piezoceramic element 22 such that pipe wall deflections work against the seismic mass 23. In other words, the piezoceramic element 22 is sandwiched between the pipe wall and the seismic mass 23 thereby squeezing the piezoceramic element 22. The piezoceramic element pole faces are in direct contact with the base 21 and the seismic mass 23. In order for both compressive and tensile pipe wall deflections to be sensed by the piezoceramic element 22, the piezoceramic element 22 is compressed by preload bolt 26. The seismic mass 23 is electrically insulated from bolt 26 by nylon washer 27. The washer 26 also acts as a preload spring.

A wire (not illustrated) transfers charge from the piezoceramic element 22 to preamp 24. The wire is spot welded to the top of the seismic mass 23. The preamp 24 is soldered into the slot of the bolt 26 to provide an electrical ground and to support the preamp 24. The center connector pin 25 is the center conductor of a BNC type connector. The center connector pin 25 is soldered into a slot on top of the preamp board 24 to provide supply power to the preamp 24 and to provide a signal transmission path from the transducer 20 (40).

The base 21 is threaded in order to receive a threaded transducer housing (not illustrated) which protects the transducer components. The center connector pin 25 acts as a detector signal path. During assembly, pipe sealant is applied to the base and housing threads, the bolt 26, and the center connector pin 25 BNC threads in order to waterproof the transducer.

The base 21 includes a magnet (not illustrated) to attach the transducer 20 (40) to the pipe 10. If a non-ferromagnetic pipe is being tested, then another way of fixing the transducers to the pipe must be used.

As illustrated in FIG. 5, the electrical signals from transducers 20 and 40 are sent to detector amplifiers 61 and 81.

Figure 7:
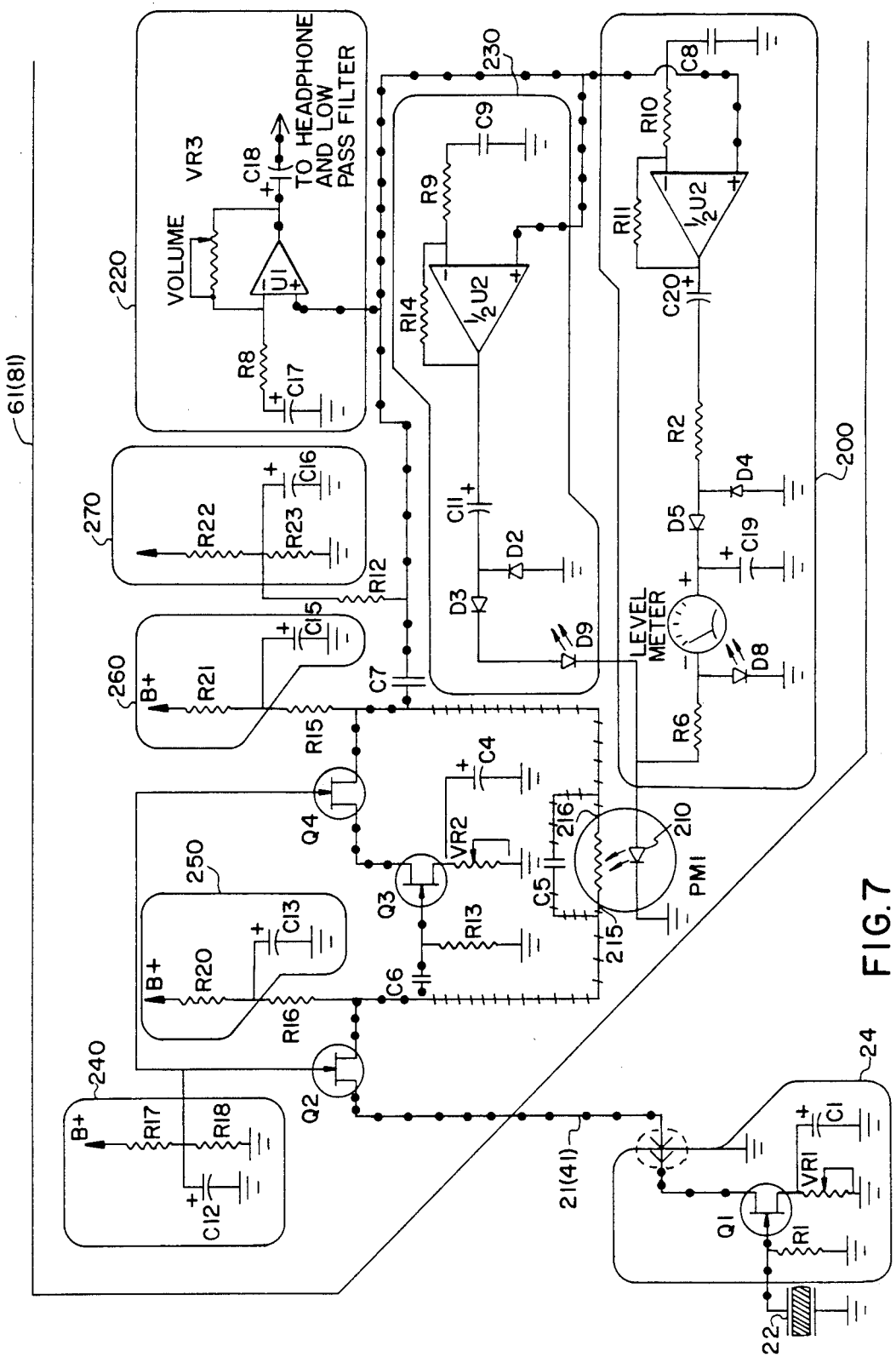
FIG. 7 illustrates a preamplifier circuit and a detector amplifier circuit of FIG. 5.

FIG. 7 illustrates a suitable circuit design for the preamp and detector amplifiers 61 and 81. In FIG. 7, the main signal path is indicated by dotted lines. Each transducer signal is amplified in two cascade stages. The first stage includes transistors Q1 and Q2. The first stage has a voltage gain of approximately 30 to 33 and has an output impedance of slightly less than 100K ohms. Resistor R1 sets the input impedance at 3 meg ohms, for dissipating any charge developed across piezoceramic element 22 due to temperature fluctuations, yet also passing signals above 30 Hz unattenuated. Junction Field Effect Transistors (JFETs) are utilized for transistor Q1 in the preferred embodiment since MOSFETs have a tendency to become damaged if the transducer is inadvertently dropped.

The second of the two cascade amplification stages comprises transistors Q3 and Q4. The second stage is essentially the same as the first stage except that the second stage includes a variable negative feedback path which is indicated by hashed lines in FIG. 7. The feedback path includes a photomodule PMI to vary the voltage gain and input impedance of the second stage.

The output from transistor Q4 feeds a main AGC amplifier 200. In the main AGC amplifier 200, the signal from transistor Q4 is amplified, high pass filtered, and rectified to provide a gain control voltage to photomodule PM1. Capacitor C19 forms a high pass filter with the other main AGC components. The following example illustrates the operation of photomodule PM1. As current is increased through light emitting diode (LED) 210 in photomodule PM1, the resistance between terminals 215 and 216 decreases to decrease the gain and input impedance of the second stage comprised of transistors Q3 and Q4. The decrease in the input impedance of the second stage causes a decrease in the gain of the first stage comprised of transistors Q1 and Q2. Use of a photomodule in the feedback circuit minimizes distortion.

The overall gain of the amplifiers comprised of transistors Q1 through Q4 can vary between 2 and 1000. A gain of 1000 occurs when the resistance across photomodule PM1 is essentially infinite due to no current flowing through LED 210.

The drain currents through transistors Q1 and Q3 are set to approximately 45 microamps by bias adjustment variable resistors VR1 and VR2. This provides a zero voltage differential across terminals 215 and 216 which minimizes distortion when transistor Q2 must drive low impedances (i.e., high negative feedback situations) and eliminates audible popping and surging during automatic gain control level changes.

Transistor Q4 also feeds headphone amplifier 220 and ear protection circuit 230. Headphones are provided to allow a trained listener to determine whether the transducer signals are due to a leak or some other source, such as traffic sounds or radio interference. Headphone amplifier 220 is a user adjustable variable gain amplifier. An operator's listening level is adjusted by varying variable resistor VR3.

The ear protection circuit 230 is similar to the main AGC amplifier 200 except that the DC output from the ear protection circuit is not filtered in order to provide rapid gain attenuation when a transducer is accidentally bumped or jarred. Diode D9 ensures that the ear protection circuit 230 does not effect transducer signal amplification under normal transducer signal level conditions.

The detector amplifiers 61 and 81 also include FET bias circuit 240 to bias transistors Q2 and Q4; supply bypass circuits 250 and 260; and op-amp bias circuit 270.

The main AGC amplifier 200 of FIG. 7 may be modified to act as an integrator to eliminate low frequency amplitude modulation of the signal provided to photomodule PM1 to improve the accuracy of the Fast Fourier Transform, to be described below.

After the transducer signals are amplified in detector amplifiers 61 and 81, the signals from detector amplifiers 61 and 81 are then transmitted to automatic gain control (AGC) circuits 62 and 82, via signal lines 21 and 41 respectively. Signal lines 21 and 41 can be coaxial transmission lines. Alternatively, the signals can be transmitted to AGC circuits 62 and 82 using radio waves or other forms of electromagnetic radiation. Since cable is cumbersome, the preferred technique is to transmit the transducer signals to AGC circuits 62 and 82 using radio waves. A suitable transmitter is Cetec Vega Rangers Model T-93 and a suitable receiver is Cetec Vega Rangers Model R-97.

AGC circuits 62 and 82 optimize signal levels for subsequent analog-to-digital conversion. After the signal levels are optimized in AGC circuits 62 and 82, the signals are transmitted to low pass filters 66 and 86, via signal lines 64 and 84, as illustrated in FIG. 5. Filters 66 and 86 are 1400 Hz 4-th order low pass filters constructed in accordance with standard filter design techniques. The low pass filters 66 and 86 are provided for anti-aliasing.

After filtering, the filtered transducer signals are transmitted to sample and hold circuits 72 and 92, via signal lines 68 and 88, respectively. Sample and hold circuits 72 and 92 hold the signals from the low pass filters when a clock, or hold, signal is received via signal line 134. In the preferred embodiment, sample and hold circuits 72 and 92 are Harris HA 5320 sample and hold circuits or the equivalent.

The sample and hold circuits 72 and 92 transmit their analog outputs to input terminals (IN) of analog-to-digital (A/D) converters 112 and 114 via signal lines 136 and 137, respectively. The clock signal is generated by timer 116 and synchronizes the entire process of storing sampled transducer signals into computer 160. In the preferred embodiment, the timer is an Intel 8253 chip or equivalent. The timer generates the periodic clock signal by counting up to a predetermined number and then transmitting the clock signal on signal line 134 when the count reaches the predetermined number. This predetermined number is set in the timer 116 via a signal on signal line 142 from computer 160. In order to receive this predetermined number via signal line 142, the timer 116 must be brought out of the high impedance state by an enable signal on signal line 133.

The clock signal is also transmitted to the start (START) terminals of A/D converters 112 and 114 to cause the A/D converters to convert the analog outputs received from sample and hold circuits 72 and 92 into digital form. In the preferred embodiment, A/D converters 112 and 114 are Harris HI674 or Burr-Brown ADC674 A/D converters or the equivalent. Conversion requires approximately 12 $\mu$s.

When A/D conversion is complete, A/D converter 114 transmits a ready signal from the ready (RDY) terminal of the A/D converter to a status buffer 118 via signal line 131. Both A/D converters complete conversion at approximately the same time. A/D converter 114 is read first so that by the time the computer 160 reads A/D converter 112, plenty of time has elapsed to ensure complete conversion. The status buffer 118 is a 74541 tri-state latch or the equivalent.

The computer 160 reads the A/D conversion results by sequentially reading the status buffer 118, the A/D converter 114, and the A/D converter 112, via signal lines 141, 144, and 143 respectively. That is, first the status buffer is read to ascertain whether conversion is complete. If conversion is complete, the computer 160 then reads the A channel conversion results via signal line 144 and then the B channel conversion results via signal line 143. Since the outputs of status buffer 118, A/D converter 114, and A/D converter 112 are normally in the high impedance state, the outputs must be brought out of the high impedance state via enable signals on signal lines 132, 138, and 135, respectively. In the preferred embodiment, 4096 conversion results are stored for each channel.

Addresses for reading the status buffer 118, the A/D converter 114, and the A/D converter 112 are sent out from the computer 160 address bus via signal line 145. The address decoder 122 generates the enable signals based on the address information on signal line 145. The address decoder 122 comprises standard logic circuits.

In this way, the results of the A/D conversions are transmitted from A/D converters 112 and 114 to computer 160 via signal lines 143 and 144, respectively. The digital signals are received in the data bus of the computer 160.

In the preferred embodiment, the computer 160 is a 16 bit binary computer. The SNAP 1+1 manufactured by Dataview is suitable for use as the personal computer 160.

Figure 8:
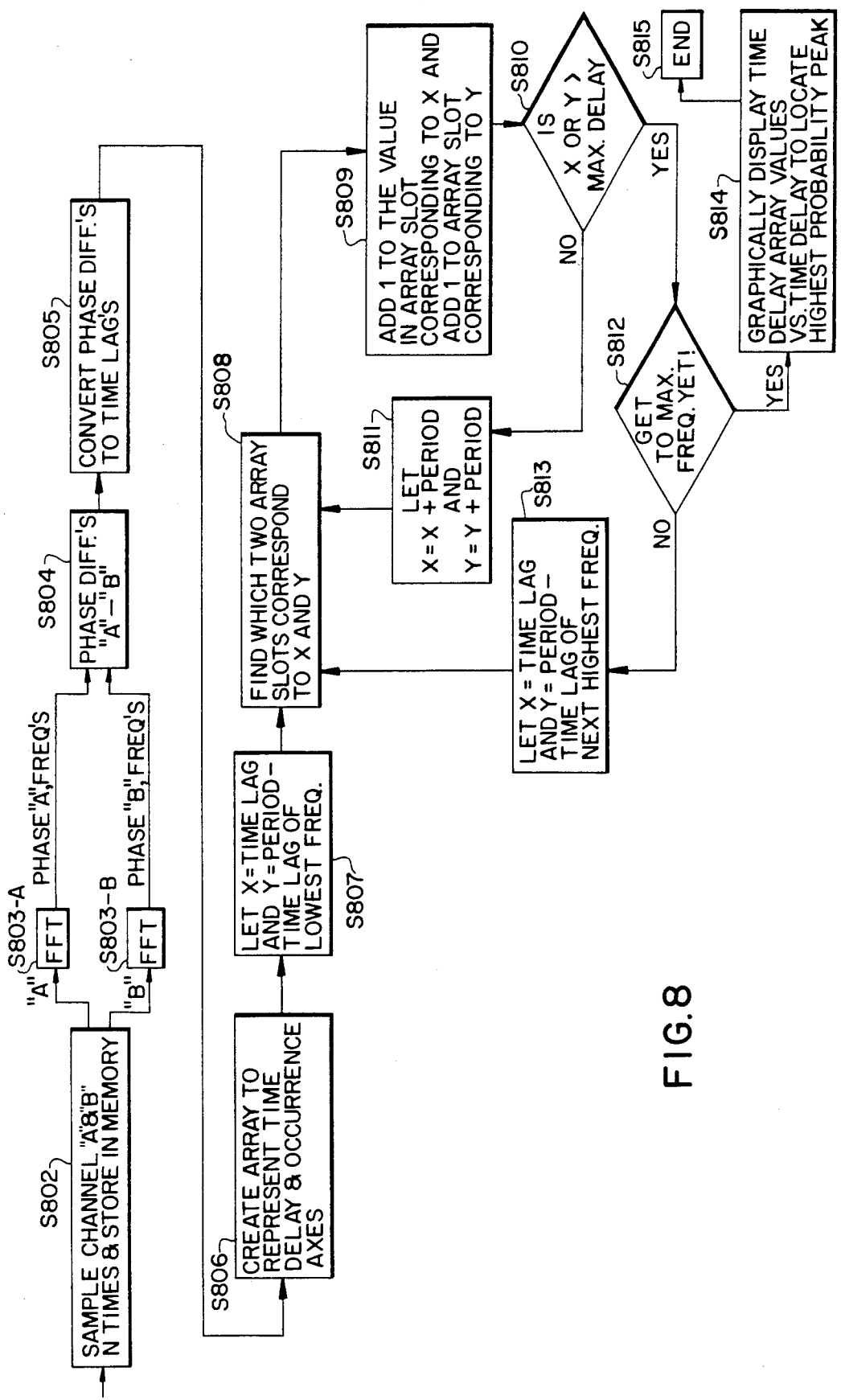
FIG. 8 illustrates processing performed by the computer of FIG. 5.

FIG. 8 illustrates the operation of the computer 160. In the preferred embodiment, all of the steps illustrated in FIG. 8 are performed by a digital computer program stored in a memory of computer 160. The computer is programmed in Turbo C, developed by Borland Corporation. The best time to initiate the FIG. 8 leak detection procedure is when traffic and other noises are at a minimum.

Prior to step S802, the computer 160 sets the sample rate of timer 116 by sending the timer 116 a predetermined number via signal line 142, as described above. In the preferred embodiment, the sample rate is 250 $\mu$s. In step S802, the digitized A channel signal present on signal line 144 and the digitized B channel signal present on signal line 143 are stored in memory at the sampling frequency of 4000 Hz, which corresponds to one sample in each channel every 250 $\mu$s. In the preferred embodiment, 4096 data points are stored in memory for the a channel and 4096 data points are stored in memory for the B channel. The sampling frequency and number of data points stored may vary depending on the particular application.

The 4096 data points for each channel represent the transducer outputs over a period of $$4096 \cdot 250 \ \mu s = 1.024 \ seconds.$$

In step S803, a first Fourier transform (FET) is performed for each of the two channels. Any standard FFT algorithm can be employed, for example, the algorithm described by C.F. Burrus in *Fortran Programs for the DFT and Convolution*, on pages 112–113. The Burrus program outputs data in complex, i.e., real and imaginary, form. The FFT program of the instant invention converts these real and imaginary components into phase information. The FFT algorithm utilizes the digitized transducer signals over the 1.024 s time period to generate corresponding frequency spectrums. The FFT algorithm also generates a phase angle for each frequency component of each channel. That is, in step S803-A, a frequency spectrum is generated for channel A and each frequency component has associated with it a phase angle. Similarly, in step S803-B, a frequency spectrum is generated for channel B and each frequency component has associated with it a phase angle. In the preferred embodiment, 2048 discrete frequency components from approximately 0 Hz to 2000 Hz are generated by the FFT and components from approximately 50 Hz to approximately 1400 Hz are subsequently used for leak location determination.

At step S804, the phase of B is subtracted from the phase of A at each frequency. These phase differences are converted into time lags in step S805.

In step S806, an array is created to keep track of the number of times a given time lag occurs. For example, in the preferred embodiment a one dimensional array with twelve hundred one individual slots is generated. Each slot corresponds to a specific time lag range, e.g., 0.5 milliseconds.

Steps S807, S808, S810, S811, S812, and S813 are performed to increment the value of each slot every time a time lag falls within the time lag range associated with that slot. This process is analogous to constructing the FIG. 4 histogram.

In step S807, a variable X is set equal to the time lag of the lowest frequency. This step is analogous to the step represented by Equation (9-0). Also, in step S807, a variable Y is set equal to the period of the lowest frequency minus the time lag of the lowest frequency. This step is analogous to the step represented by Equation (10-0). In step S808, the array slots, or time delay ranges, which correspond to X and Y are ascertained.

In step S809, one is added to the array slot corresponding to X and one is added to the array slot corresponding to Y. In step S810, the program determines whether X or Y is greater than a predetermined maximum possible delay value. If X and Y have not reached the maximum possible delay value, the program proceeds to step S811. In step S811, X is increased by the period of the lowest frequency component and Y is increased by the period of the lowest frequency component. Step S811 is analogous to the transition from Equation (9-0) to Equation (9-1) and from Equation (10-0) to Equation (10-1). Steps S808, S809, S810, and S811 are repeated until a maximum possible delay value is reached.

When the maximum possible delay value is reached in step S810, the program proceeds to step S812. In step S812, the program determines whether or not the maximum frequency has been reached. Since steps S808, S809, S810, and S811 have only been performed with respect to the lowest frequency, steps S808, S809, S810, and S811 must be reperformed using each frequency up to the maximum frequency. Accordingly, X is set equal to the time lag of the next highest frequency component and Y is set equal to the period of the next highest frequency component minus the time lag of the next highest frequency component in step S813, and steps S808, S809, S810, and S811 are repeated for the next highest frequency component. Steps S808, S809, S810, S811, S812, and S813 are repeated for all frequencies until the maximum frequency is reached in step S812.

Figure 9:
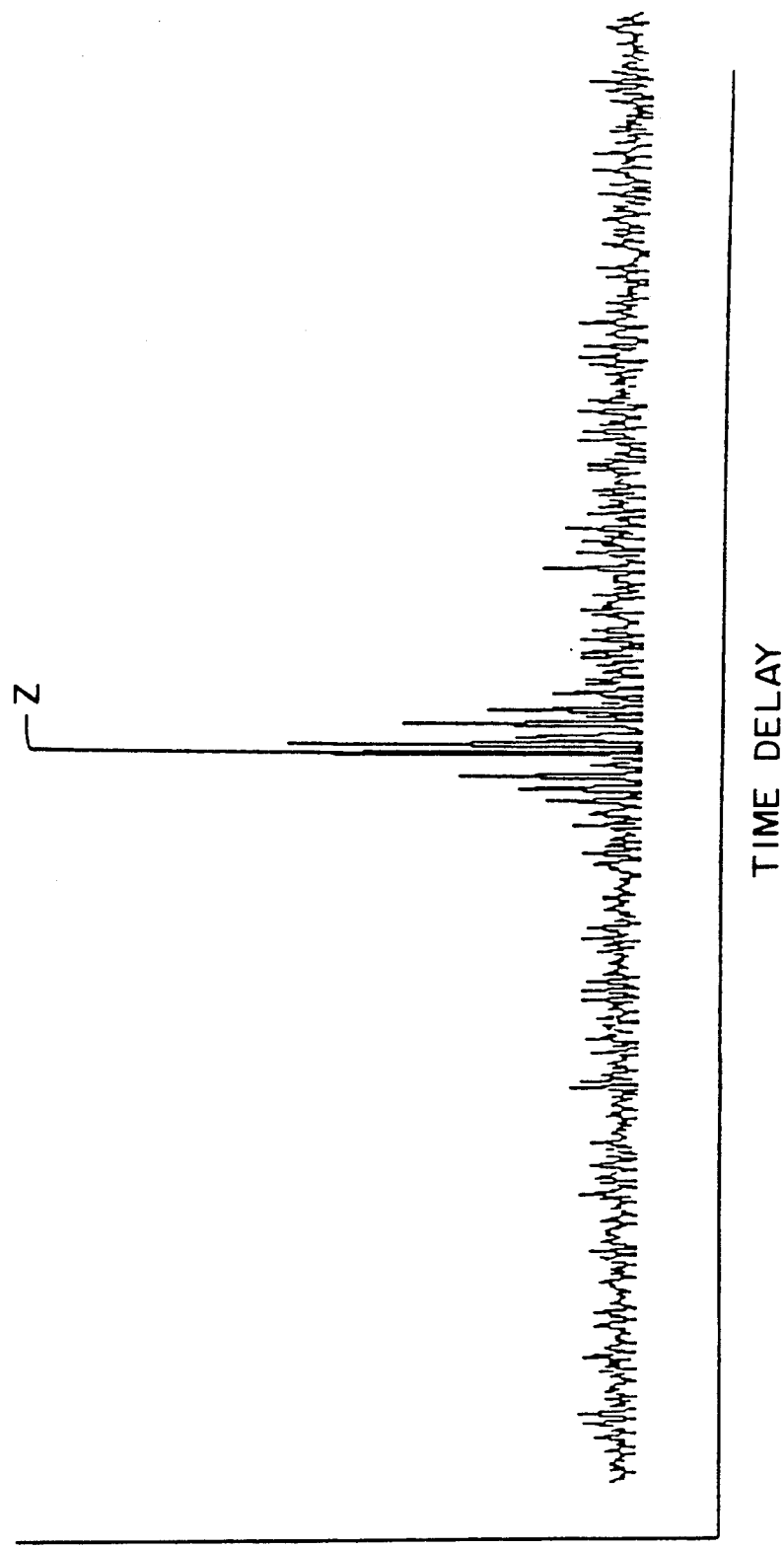
FIG. 9 is an actual histogram illustrating occurrences of potential time delay values.

When the maximum frequency is reached in step S812, the program proceeds to step S814. In step S814, a graph of the time delay array values versus the time delay occurrence is displayed so that an operator can determine the most probable time delay value, and thus the most probable leak location. FIG. 9 is an actual histogram illustrating the occurrence of time delay values. The most probable time delay value is used by the computer 160 or by the operator to calculate the leak location as described above.

By observing a display such as illustrated in FIG. 9, an operator can ascertain the most probable time delay. For example, in FIG. 9 the time delay corresponding to point Z is the most probable time delay. This most probable time delay is then used either by the computer 160 or by the operator to calculate the leak location in accordance with Equations (1) and (3). Displaying the histogram to the operator helps the operator verify that the leak detection system is operating properly. For example, if a displayed histogram exhibits no predominant peak, then the operator would be alerted to a potential problem with the leak location calculation.

The accuracy of the most probable time delay value calculation can be improved by detecting the leak sounds for additional periods of time, performing the processing described above for these additional data, and averaging the data collected. The averaged data would then be displayed in a format similar to that illustrated in FIG. 9.

The invention can also be used to determine the location of a leak in a pipe which contains two or more different pipe sections. Each pipe section has a different pipe diameter and/or a different material, thus resulting in different sound propagation velocities in each of the sections.

Figure 10:
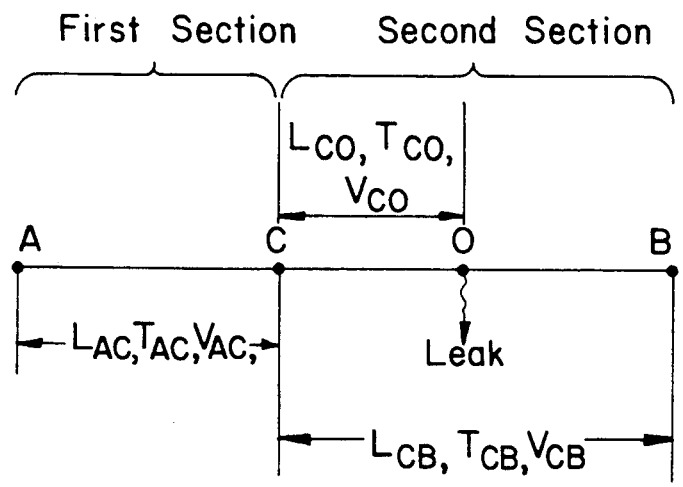
FIG. 10 illustrates a length of pipe having two different pipe sections.

FIG. 10 illustrates a length of pipe having a first section from point A to point C and a second section from point C to point B. A leak is illustrated at point 0. In FIG. 10, the leak is shown to be located between points C and B, however, whether the leak is located between points C and B or between points A and C must be determined by the processing performed in the computer 160.

The following quantities will be used to calculate the location of the leak in a pipe having two pipe sections:

$L_{AC}$ is the pipe length of the first pipe section and is positive.

$L_{CB}$ is the pipe length of the second pipe section and is positive.

$L_{CO}$ is the pipe length from C to leak location O and can be positive or negative.

$T_{AC}$ is the elapsed time for sound to travel from A to C and is positive.

$T_{CB}$ is the elapsed time for sound to travel from C to B and is positive.

$T_{CO}$ is the elapsed time for sound to travel from C to O and can be positive or negative. The sign of $L_{CO}$ is the same as the sign of $T_{CO}$.

$V_{AC}$ is the speed of sound in the first pipe section and is positive.

$V_{CB}$ is the speed of sound in the second pipe section and is positive.

$V_{CO}$ is the speed of sound in the section of pipe where the leak is located and is positive.

T is the time delay as defined above and is determined using the histogram technique for use in the formulas below.

Since the leak location is what is to be determined, $V_{CO}$ is initially unknown because whether the leak is located in the first pipe section or the second pipe section is unknown.

T may be expressed by the following relations:

$$T = T_{AO} = T_{OB} \tag{13}$$

$$T = (T_{AC} + T_{CO}) - (T_{CB} - T_{CO}) \tag{14}$$

$$T = T_{AC} - T_{CB} + 2T_{CO} \quad (15)$$

The values of $T_{AC}$ and $T_{CB}$ may be determined from the following equations:

$$T_{AC} = \frac{L_{AC}}{V_{AC}} \quad (16)$$

$$T_{CB} = \frac{L_{CB}}{V_{CB}} \quad (17)$$

Applying Equations 16 and 17 to Equation 15 results in the following expression for T:

$$T = \frac{L_{AC}}{V_{AC}} - \frac{L_{CB}}{V_{CB}} + 2 T_{CO} \quad (18)$$

Equation 18 can be solved for $T_{CO}$ to result in the following expression:

$$T_{CO} = \frac{1}{2}\left(T + \frac{L_{CB}}{V_{CB}} - \frac{L_{AC}}{V_{AC}}\right) \quad (19)$$

The sign of $T_{CO}$ is used to ascertain whether the leak location O is in the first section or the second section. If $T_{CO}$ is less than or equal to O, then the leak location is in the first section. If $T_{CO}$ is greater than O then the leak location is in the second section between points B and C. The following expression is used to determine $L_{CO}$ if $T_{CO}$ is less than or equal to 0:

$$L_{CO} T_{CO} V_{AC} \quad (20)$$

If $T_{CO}$ is greater than 0 then the following equation is used for $L_{CO}$:

$$L_{CO} = T_{CO} V_{CB} \quad (21)$$

The value of $L_{CO}$ from either Equation 20 or Equation 21 is inputted into the following equations to determine the location of the leak relative to the transducer locations:

$$L_{AO} = L_{AC} + L_{CO} \quad (22)$$

$$L_{OB} = (L_{AC} + L_{CB}) - L_{AO} \quad (23)$$

Figure 11:
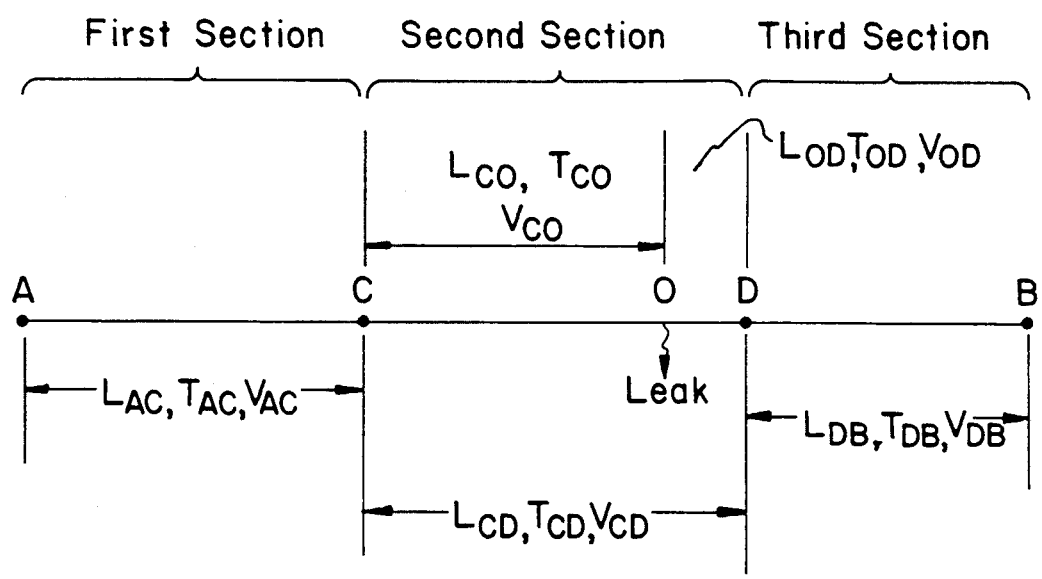
FIG. 11 illustrates a length of pipe having three different pipe sections.

The above method can also be applied to a pipe length having three or more different pipe sections, such as illustrated in FIG. 11. In the explanations that follow the same notation used above applies.

The elapsed time for sound to travel from C to D, $T_{CD}$ can be calculated using the following expression:

$$T_{CD} = \frac{L_{CD}}{V_{CD}} \quad (24)$$

The elapsed time for sound travel from C to O, $T_{CO}$ can be expressed by the following equation:

$$T_{CO} = \frac{1}{2}\left(T + \frac{L_{DB}}{V_{DB}} + \frac{L_{CD}}{V_{CD}} - \frac{L_{AC}}{V_{AC}}\right) \quad (25)$$

The sign of $T_{CO}$ must be examined, and in some cases the relationship between $T_{CO}$ and $T_{CD}$ in order to ascertain which section of pipe contains the leak.

If $T_{CO}$ is less than or equal to 0, then the leak is located in the first section of pipe and the following equations are used to determine the leak location:

$$L_{CO} = T_{CO} V_{AC} \quad (26)$$

$$L_{AO} = L_{AC} + L_{CO} \quad (27)$$

If $T_{CO}$ is greater than O and $T_{CO}$ is less than or equal to $T_{CD}$, then the leak is located in section two and the following equations apply:

$$L_{CO} = T_{CO} V_{CD} \quad (28)$$

$$L_{AO} = L_{AC} + L_{CO} \quad (29)$$

If $T_{OC}$ is greater than 0 and $T_{CO}$ is greater than $T_{CD}$, then the leak is in section three and the following equations apply:

$$T_{OD} = T_{CO} - T_{CD} \quad (30)$$

$$L_{OD} = V_{OD} T_{OD} \quad (31)$$

$$L_{OD} = V_{DB}(T_{CO} - T_{CD}) \quad (32)$$

$$L_{AO} = L_{AC} + L_{CD} + L_{OD} \quad (33)$$

It is possible to use a plot of phase differences versus frequency to ascertain which frequency ranges contain the most leak sound. This process, called phase filtering, will be described below.

Figure 12:
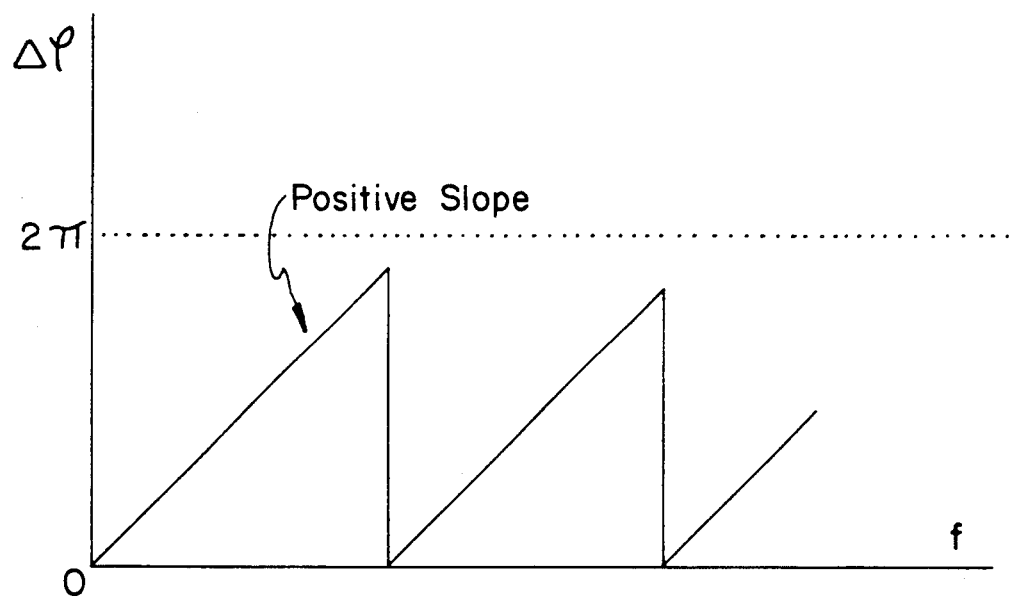
FIG. 12 is a graph for explaining relationships between phase difference and frequency.

When $\Delta t$ is constant, $\Delta \phi$ is a periodic linear function of frequency. A theoretical graph of $\Delta \phi$ versus frequency is illustrated in FIG. 12.

Figure 13:
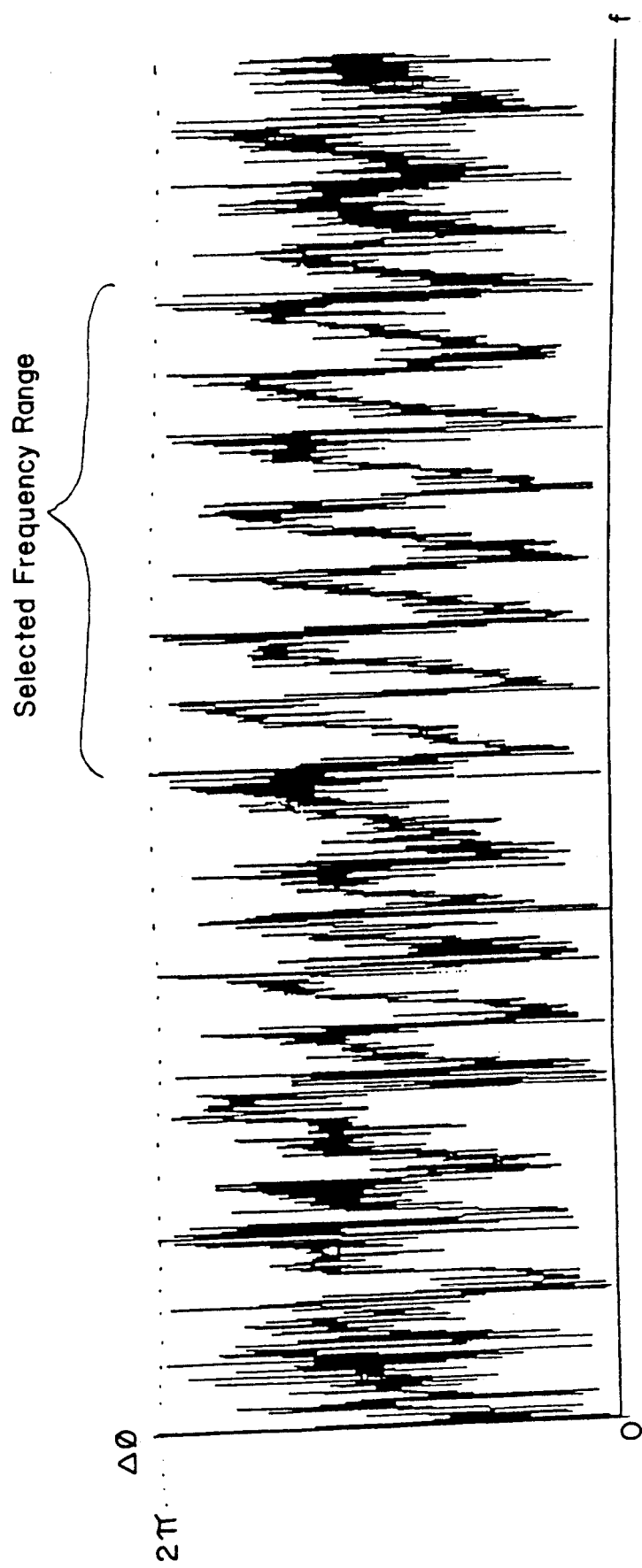
FIG. 13 is an actual graph of a phase difference versus frequency plot used to select frequencies for pipe leak location determination processing.

The above-described theoretical $\Delta \phi$ versus frequency characteristics can be used to select certain frequency ranges of interest. These selected frequency ranges contain a large portion of the leak sound and thus result in more accurate processing and leak location prediction. FIG. 13 is an actual graph of a phase difference versus frequency plot. A plot such as illustrated in FIG. 13 can be used either by the computer 160 or by the operator to select various frequency ranges which contain the most pipe leak sound.

Different pipe leak sounds are made up of different combinations of frequencies and not all fundamental frequencies which the FFT calculates contribute to or make up the pipe leak sounds. The saw-tooth shape shown in FIG. 12, when revealed in a $\Delta \phi$ versus frequency graph, provides a clue of which particular frequency information is attributable to the leak. This sawtooth shape can be used to filter or select which range of frequencies, and accompanying $\Delta \phi$ values, should be used in the construction of the histogram and which group of frequencies, and $\Delta \phi$ values, should not be used in the construction of the histogram. For example, as illustrated in FIG. 13, the frequency range indicated by the bracket exhibits the sawtooth shape and therefore this frequency range contains the most reliable leak sound information.

The method and apparatus described above is not limited to locating pipe leaks, but can be used to determine the location of a wide variety of sources of sound generation. If the sound velocity at various frequencies is not sufficiently independent of frequency, then different sound velocities for the various frequencies can be used.

The foregoing description has been set forth merely to illustrate preferred embodiments of the invention and is not intended to be limiting. Since modification of the described embodiments incorporating the spirit and substance of the invention may occur to persons skilled in the art, the scope of the invention should be limited solely with respect to the appended claims and equivalents.

What is claimed is:

1. An apparatus for determining the location of a sound source, said apparatus comprising:
   a first detector, located at a first location remote from said sound source, converting sound from said sound source into a first signal;
   a second detector, located at a second location remote from said sound source, converting sound from said sound source into a second signal;
   a first transform means for calculating first phase angles of a plurality of frequency components of said first signal;
   a second transform means for calculating second phase angles of a plurality of frequency components of said second signal;
   a phase difference calculating means for calculating phase differences between said first phase angles and said second phase angles at each of a plurality of frequencies and for converting said phase differences into a plurality of time lags;
   a multiple means for adding to each time lag of said plurality of time lags integer multiples of one of a plurality of periods to form a plurality of potential time delays at each of said plurality of frequencies;
   selection means for determining which time delay occurs most frequently among said plurality of potential time delays at said plurality of frequencies; and
   location calculating means for calculating said location of said sound source utilizing said most frequency occurring time delay.

2. An apparatus as set forth in claim 1, wherein said sound source is a pipe leak.

3. An apparatus as set forth in claim 2, wherein said first and second detectors include electromechanical transducers to sense sound transmitted along a pipe.

4. An apparatus as set forth in claim 3, wherein said first and second detectors include junction field effect transistors.

5. An apparatus as set forth in claim 3, wherein said first and second detectors sense sound transmitted along said pipe utilizing a rigid member, located between said pipe and at least one of said first and second detectors, as a sound transmission path.

6. An apparatus as set forth in claim 2, wherein the number of said plurality of frequencies is in excess of approximately one thousand.

7. An apparatus as set forth in claim 6, wherein said plurality of frequencies are less than approximately 2000 Hz.

8. An apparatus as set forth in claim 2, wherein said first and second detectors are remote from said first and second transform means, said phase difference calculating means, said multiple means, said selection means, and said location calculating means and wherein said first and second detectors transmit said first and second signals through the atmosphere in the form of electromagnetic radiation.

9. An apparatus as set forth in claim 2, wherein said apparatus further comprises headphones to allow an operator to hear at least one of said first and second signals.

10. An apparatus as set forth in claim 2, wherein said apparatus further comprises:
    a first low pass filter attenuating high frequencies in said first signal; and
    a second low pass filter attenuating high frequencies in said second signal.

11. An apparatus as set forth in claim 10, wherein said first and second low pass filters having cut-off frequencies of approximately 1400 Hz.

12. An apparatus as set forth in claim 2, wherein said apparatus further comprises:
    a first sample and hold circuit holding said first signal; and
    a second sample and hold circuit holding said second signal.

13. An apparatus as set forth in claim 12, wherein said apparatus further comprises:
    a first analog-to-digital converter, connected to an output of said first sample and hold circuit, to convert first signal samples into digital form for processing by said first transform means; and
    a second analog-to-digital converter, connected to an output of said second sample and hold circuit, to convert second signal samples into digital form for processing by said second transform means.

14. An apparatus as set forth in claim 1, wherein said apparatus further comprises a display displaying a histogram illustrating an occurrence rate of said potential time delays.

15. An apparatus as set forth in claim 1, wherein said phase differences include a phase difference associated with a phase of said first signal minus a phase of said second signal and a phase difference associated with a phase of said second signal minus a phase of said first signal.

16. An apparatus as set forth in claim 1, wherein said first and second transform means perform Fast Fourier Transforms.

17. A method of determining the location of a sound source comprising the steps of:
    (a) detecting sound at a first location and generating a first signal indicative of sound at said first location;
    (b) detecting sound at a second location and generating a second signal indicative of sound at said second location;
    (c) performing a Fast Fourier Transform of said first signal to generate a first phase angle of a first frequency component and a third phase angle of a second frequency component;
    (d) performing a Fast Fourier Transform of said second signal to generate a second phase angle of said first frequency component and a fourth phase angle of said second frequency component;
    (e) calculating a difference between said first phase angle and said second phase angle to generate a first time lag;
    (f) generating a plurality of first possible time delays by adding integer multiples of a first period to said first time lag;
    (g) calculating a difference between said third phase angle and said fourth phase angle to generate a second time lag;

(h) generating a plurality of second possible time delays by adding integer multiples of a second period to said second time lag; and (i) utilizing a most frequently occurring time delay from among said first and second possible time delays to calculate said location of said sound source.

18. A method of determining the location of a sound source comprising the steps of:

(a) detecting sound at a first location and generating a first signal indicative of sound at said first location;

(b) detecting sound at a second location and generating a second signal indicative of sound at said second location;

(c) calculating a time lag between said first and second signals for each of a plurality of frequency components;

(d) adding integer multiples of one of a plurality of periods to each time lag to form a plurality of potential time delays at each of a plurality of frequencies;

(e) storing said plurality of potential time delays of all of said plurality of frequencies in a memory;

(f) selecting from said memory a time delay value which occurs most frequently; and (g) utilizing said time delay value which occurs most frequently to calculate said location of said sound source.

19. A method as set forth in claim 18, wherein said sound at said first location includes sound due to a pipe leak and said sound at said second location includes sound due to said pipe leak.

20. A method as set forth in claim 18, wherein step (c) includes generating Fourier spectrums of said first and second signals.

21. A method as set forth in claim 18, wherein said time lag between said first and second signals is derived from phase information of said first and second signals.

22. An apparatus for determining the location of a fluid leak, said apparatus comprising:

a first detector, located at a first location, converting sound from said fluid leak into a first signal;

a second detector, located at a second location, converting sound from said fluid leak into a second signal;

a phase difference calculating means for calculating phase differences between said first signal and said second signal at at least one specific frequency; and location determining means for deriving said location of said fluid leak utilizing said phase differences.

23. An apparatus as set forth in claim 22, wherein said location determining means derives a location of a pipe leak.

24. An apparatus as set forth in claim 22, wherein said location determining means derives a location of a pipe leak in a length of pipe having two sections.

25. An apparatus as set forth in claim 22, wherein said location determining means derives a location of a pipe leak in a length of pipe having three sections.

26. An apparatus as set forth in claim 22, further comprising a transform means for performing Fast Fourier Transforms of said first and second signals.

27. An apparatus for determining the location of a sound, said apparatus comprising:

a first detector, located at a first location, converting sound from said sound source into a first signal;

a second detector, located at a second location, converting sound from said sound source into a second signal;

a phase difference calculating means for calculating phase differences between said first signal and said second signal at at least one specific frequency;

location determining means for deriving said location of said sound source utilizing said phase differences; and a frequency selecting means for selecting frequencies based on phase difference versus frequency information.

28. A method of determining the location of a fluid leak comprising the steps of:

(a) detecting sound of a fluid leak at a first location and generating a first signal indicative of sound at said first location;

(b) detecting sound of said fluid leak at a second location and generating a second signal indicative of sound at said second location;

(c) deriving phase differences between said first and second signals at at least one specific frequency; and (d) utilizing said phase differences to derive said location of said fluid leak.

29. A method as set forth in claim 28, wherein step (d) includes utilizing said phase differences to derive a location of a pipe leak.

30. A method as set forth in claim 29, wherein step (d) includes utilizing said phase differences to derive a location of a pipe leak located in a length of pipe having two sections.

31. A method as set forth in claim 29, wherein step (d) includes utilizing said phase differences to derive a location of a pipe leak located in a length of pipe having three sections.

32. A method of determining the location of a sound source comprising the steps of:

(a) detecting sound at a first location and generating a first signal indicative of sound at said first location;

(b) detecting sound at a second location and generating a second signal indicative of sound at said second location;

(c) deriving phase differences between said first and second signals at at least one specific frequency;

(d) utilizing said phase differences to derive said location of said sound source; and (e) selecting frequencies based on phase difference versus frequency information.

33. A method as set forth in claim 28, wherein step (c) includes generating Fourier spectrums of said first and second signals.

34. An apparatus for determining the location of a sound source, said apparatus comprising:

a first detector, located at a first location remote from said sound source, which converts sound from said sound source into a first signal;

a second detector, located at a second location remote from said sound source, which converts sound from said sound source into a second signal;

a first transform calculation unit which calculates first phase angles of a plurality of frequency components of said first signal;

a second transform calculation unit which calculates second phase angles of a plurality of frequency components of said second signal;

a phase difference calculation unit which calculates phase differences between said first phase angles and said second phase angles at each of a plurality of frequencies and which converts said phase differences into a plurality of time lags;

a multiple calculation unit which adds to each time lag of said plurality of time lags integer multiples of one of a plurality of periods to form a plurality of potential time delays at each of said plurality of frequencies;

a selection unit which determines which time delay occurs most frequently among said plurality of potential time delays at said plurality of frequencies; and a location calculation unit which calculates said location of said sound source utilizing said most frequently occurring time delay.

35. An apparatus for determining the location of a fluid leak, said apparatus comprising:

a first detector, located at a first location remote from said fluid leak, which converts sound from said fluid leak into a first signal;

a second detector, located at a second location remote from said fluid leak, which converts sound from said fluid leak into a second signal;

a first transform calculation unit which calculates first phase angles of a plurality of frequency components of said first signal;

a second transform calculation unit which calculates second phase angles of a plurality of frequency components of said second signal;

a phase difference calculation unit which calculates phase differences between said first phase angles and said second phase angles at each of a plurality of frequencies and which converts said phase differences into a plurality of time lags;

a multiple calculation unit which adds to each time lag of said plurality of time lags integer multiples of one of a plurality of periods to form a plurality of potential time delays at each of said plurality of frequencies;

a selection unit which determines which time delay occurs most frequently among said plurality of potential time delays at said plurality of frequencies; and a location calculation unit which calculates said location of said fluid leak utilizing said most frequently occurring time delay.

36. An apparatus for determining the distance to a sound source, said apparatus comprising:

a first detector which converts sound from said sound source into a first signal;

a second detector which converts sound from said sound source into a second signal;

a calculation unit which utilizes said first and second signals to generate a plurality of potential time delays;

a selection processor which determines which time delay occurs most frequently among said plurality of potential time delays; and a distance calculator which calculates a distance to said sound source utilizing said most frequently occurring time delay.

37. An apparatus as set forth in claim 36, wherein said distance calculator calculates a distance to a fluid leak utilizing said most frequently occurring time delay.

* * * * *